T. F. GOODWIN.
DIRECTION INDICATOR FOR VEHICLES.
APPLICATION FILED OCT. 27, 1919.
1,400,601.
Patented Dec. 20, 1921.
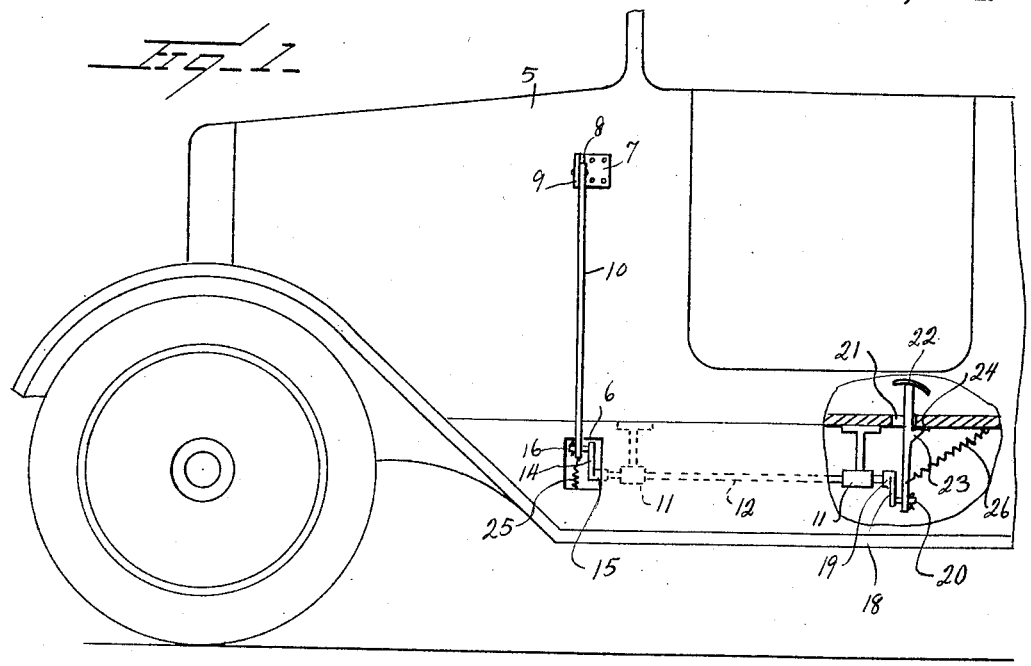
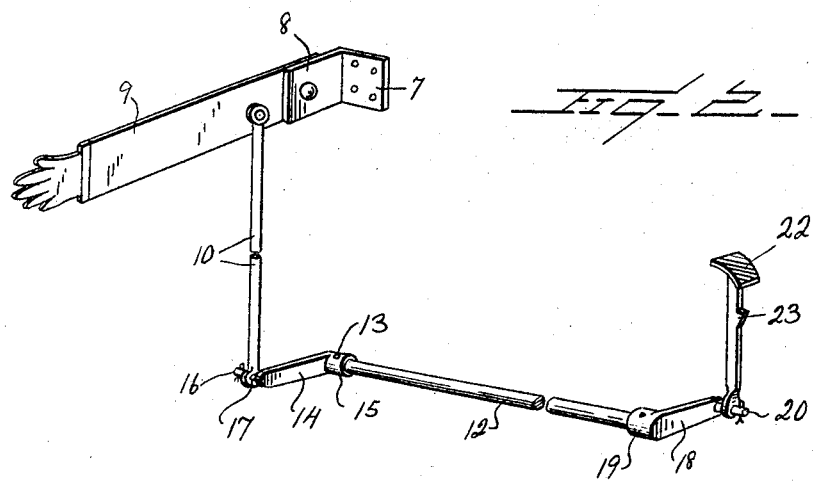
Inventor
T. F. Goodwin
By Watson E. Coleman
Attorney

UNITED STATES PATENT OFFICE.

THOMAS F. GOODWIN, OF YELM, WASHINGTON.

DIRECTION-INDICATOR FOR VEHICLES.

1,400,601.        Specification of Letters Patent.     Patented Dec. 20, 1921.

Application filed October 27, 1919. Serial No. 333,577.

*To all whom it may concern:*

Be it known that I, THOMAS F. GOODWIN, a citizen of the United States, residing at Yelm, in the county of Thurston and State of Washington, have invented certain new and useful Improvements in Direction-Indicators for Vehicles, of which the following is a specification, reference being had to the accompanying drawings.

This invention relates to direction indicators for vehicles, and has for its object to provide a device of this character which may be instantly operated by the foot of the driver to indicate the direction of travel the vehicle is about to take.

Another object of the invention is to provide a device of this character that may be held indefinitely in its indicating position.

Another object of the invention is to provide a device of this character so constructed that it is adaptable to any vehicle, without altering the construction of the vehicle.

A still further object of the invention is to provide a device of this character which does not mar the design of the vehicle as only a small portion of the operating mechanism is visible.

These objects are attained by the mechanism illustrated in the accompanying drawings, in which:

Figure 1 is a side elevation of a motor vehicle, with a portion of the vehicle cut away to show the mechanism of the direction indicator; and Fig. 2 is a perspective view of the direction indicating mechanism.

Referring to the drawings, 5 designates a vehicle of the motor driven type having a slot 6 in one side thereof adjacent the running board. Secured to the upper portion of the vehicle, on one side thereof, is a bracket 7 having an extending arm 8. Pivoted to this arm is a signal arm 9, which is disposed when in its indicating position at right angles to the side of the vehicle. Pivoted to the arm 9 adjacent its pivoted end is a link 10 which extends downwardly and has its lower end positioned over the slot 6 of the vehicle.

Depending from the frame of the vehicle is a plurality of bearings 11 in which a rock shaft is journaled. Connected to the forward end of the rock shaft 12 as at 13 is a rock lever 14. This rock lever has an arm 15 extending rearwardly and at right angles to the lever and is secured to the forward end of the shaft 12. The other end of the rock lever 14 has a forwardly extending arm 16 which extends in right angular relation to the lever, is passed through the slot 6, and is pivoted to the lower end of the lever 10, as at 17, for raising the same. A second rock lever 18 is provided and has a forwardly extending arm 19 at one end which extends in right angular relation to the lever 18 and is secured to the rear end of the rock shaft 12.

The rock lever 18 is also provided with a rearwardly extending arm 20 which extends from the other end of said lever in angular relation thereto. Slidably mounted through an opening 21 in the floor of the vehicle, adjacent the driver's seat, is an operating pedal 22 which is pivoted at one end to the rearwardly extending arm of the lever 18. The operating pedal 22 includes a locking lug 23 adapted to engage a keeper 24 secured to the vehicle at the edge of the opening 21. In order to lower the arm 9 to its non-indicating position, a spring 25 is provided and is secured at one end to the link 10 and at its other end to the vehicle 5. To eliminate the danger of the catch 23 accidentally disengaging the keeper 24 a spring 26 is provided and is connected at one end to the pedal 22 and at the other end to the vehicle.

In operation, when the driver of the vehicle is about to change his direction of travel, the operating pedal 22 is depressed, thereby rocking the rock shaft and levers and causing the lever 14 to raise the link 10 and swing the arm 9 upwardly at right angles to the side of the vehicle, thereby indicating the change of direction. Should it be necessary to indicate this change of direction for any length of time, the pedal 22 is moved rearwardly so as to cause the lug 23 to engage the keeper 24 and hold the arm in its indicating position against the tension of the spring 25. When the lug is released from the keeper the pedal is moved upwardly and the arm 9 and link 10 moved downwardly through the retraction of the spring 25, thereby returning the arm to its non-indicating position.

What is claimed is:—

A mechanical signal device for vehicles comprising a bracket secured upon and extending laterally from one side of a vehicle, a signal blade pivoted upon said bracket, a rock shaft journaled longitudinally of the vehicle and provided at its ends with oppositely extending crank arms, a link pivotally connected with one crank and pivotally connected with the blade between the pivot and free end thereof, and a slidably mounted foot pedal pivotally connected with the other crank arm.

In testimony whereof I hereunto affix my signature.

THOMAS F. GOODWIN.